United States Patent
Kim

(10) Patent No.: US 7,826,609 B1
(45) Date of Patent: *Nov. 2, 2010

(54) METHOD AND APPARATUS FOR DIGITAL NEAR-END ECHO/NEAR-END CROSSTALK CANCELLATION WITH ADAPTIVE CORRELATION

(75) Inventor: Beomsup Kim, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 915 days.

This patent is subject to a terminal disclaimer.

(21) Appl. No.: 11/149,220

(22) Filed: Jun. 10, 2005

Related U.S. Application Data

(63) Continuation of application No. 09/465,228, filed on Dec. 17, 1999, now Pat. No. 6,934,387.

(51) Int. Cl.
*H04M 9/08* (2006.01)

(52) U.S. Cl. .................................. 379/406.08

(58) Field of Classification Search ............ 379/406.08
See application file for complete search history.

(56) References Cited

U.S. PATENT DOCUMENTS

| | | | |
|---|---|---|---|
| 4,561,067 A | 12/1985 | McKeown | |
| 4,571,720 A | 2/1986 | Chevreau et al. | |
| 4,669,116 A | 5/1987 | Agazzi et al. | |
| 4,807,173 A | 2/1989 | Sommen et al. | |
| 4,852,081 A | 7/1989 | Bonnet et al. | |
| 4,995,104 A | 2/1991 | Gitlin | |
| 5,062,102 A | 10/1991 | Taguchi | |
| 5,181,198 A | 1/1993 | Lechleider | |
| 5,329,586 A | 7/1994 | Agazzi | |
| 5,396,554 A | 3/1995 | Hirano et al. | |
| 5,473,686 A | 12/1995 | Virdee | |
| 5,577,116 A | 11/1996 | Townsend et al. | |
| 5,887,032 A | 3/1999 | Cioffi | |
| 6,078,567 A | 6/2000 | Traill et al. | |
| 6,078,645 A * | 6/2000 | Cai et al. ................... 379/3 |
| 6,272,173 B1 | 8/2001 | Hatamian | |
| 6,373,908 B2 * | 4/2002 | Chan .................... 375/346 |
| 6,442,274 B1 | 8/2002 | Sugiyama | |
| 6,570,985 B1 | 5/2003 | Romesburg | |
| 6,584,159 B1 | 6/2003 | Azadet | |
| 6,741,707 B2 * | 5/2004 | Ray et al. ............ 381/71.11 |
| 6,934,387 B1 * | 8/2005 | Kim ................... 379/406.08 |

OTHER PUBLICATIONS

Zhaohong Zhang and Gunter Schmer, Performance Analysis of Line Echo Cancellation Implementation Using TMS320C6201, Mar. 1998, Digital signal processing solutions, p. 9.*

* cited by examiner

*Primary Examiner*—Alexander Jamal

(57) ABSTRACT

A communication transmitting and receiving system in which the effects of near-end echo and near-end crosstalk signal from the communication medium are mitigated by adaptively reproducing the near-end echo and near-end crosstalk signal, which is then subtracted from the received signal. Filter coefficients for a Finite Impulse Response filter are adaptively generated to reproduce the near-end echo and near-end crosstalk. The filter coefficients are regenerated for the Finite Impulse Response filter in an adaptive correlator at the arrival of each received signal and whereby each new filter coefficient is a weighted sum of a previous coefficient and one received signal multiplied by a time delayed version of one transmitted signal.

28 Claims, 9 Drawing Sheets

FIG. 4 – Prior Art ically from a transmitter connected at the oppo-
METHOD AND APPARATUS FOR DIGITAL NEAR-END ECHO/NEAR-END CROSSTALK CANCELLATION WITH ADAPTIVE CORRELATION This application is a continuation of U.S. patent application Ser. No. 09/465,228, filed Dec. 17, 1999, the entire contents of which are hereby incorporated by reference herein.

BACKGROUND

1. Field of the Invention

The present invention relates to apparatus and methods for communication of signals in a communication medium. More particularly, this invention relates to apparatus and methods to cancel echo interference and near-end crosstalk interference in a received signal from a transmitter attached to the communication system and from transmitters attached to other communication media in close proximity to the communication media.

2. Background Information

The gigabit Ethernet (1000 BASE-T) as defined by the I.E.E.E. standard 802.3ab is well known in the art. The structure capabilities and design consideration are described in:

"Gigabit Ethernet Over 4-Pair 100 OHM Category 5 Cabling," Gigabit Ethernet Alliance, Cupertino, Calif., 1999;

"Gigabit Ethernet 1000 Base-T," 1000 BASE-T Tutorial Series, Interoperability Laboratory Gigabit Ethernet Consortium, University of New Hampshire, Durham, N.H., 1998; and "Design Considerations for Gigabit Ethernet 1000 Base-T Twisted-pair Transceivers," Hatamian et al., Proceedings of the IEEE 1999 Custom Integrated Circuit Conference, IEEE, 1998, pp. 335-342.

Transmitting a gigabit data stream over four pair of category 5 unshielded twisted-pair cabling as described in the above-referenced papers has several design challenges. These challenges include signal attenuation, echo return loss, crosstalk characteristics of the cable, and electromagnetic emission and susceptibility.

Attenuation is the signal loss of the cabling from the transmitter to the receiver. Attenuation increases with frequency, which is due to such factors as skin effect. To minimize the effect of attenuation, the lowest possible frequency range that is consistent with the required data rate must be employed.

Echo is a by-product of the dual-duplex operation, where both the transmit and receive signal occupy the same wire pair. The residual transmit signal due to the trans-hybrid loss and the cabling return loss combine to produce an unwanted signal referred to here as echo.

Return loss is a measure of the amount of power reflected due to cabling impedance mismatches.

Crosstalk is an unwanted signal coupled between wire pairs that are in close proximity. Since 1000 BASE-T will use all four wire pairs, each pair is affected by crosstalk form the adjacent three pairs. Crosstalk is characterized in reference to the transmitter. Near-end crosstalk (NEXT) is crosstalk that appears at the output of a wire pair at the transmitter end of the cable and far-end crosstalk (FEXT) that appears at the output of a wire pair at the far end of the cable from the transmitter. Equal level far-end crosstalk (ELFEXT) is FEXT with the cable attenuation removed to provide equal level comparisons, i.e. crosstalk and receive signals voltages are compared at the end of the cabling opposite the transmitter. Crosstalk must be minimized to insure correct symbol recovery operations in the receiver.

A transmission system operating over unshielded cable must be capable of withstanding radiated energy from other sources, including AM, CB, short wave radio, and other external transmitters. The transmission system is required to have a tolerance to a 3 V/m continuous wave source above 27 MHz.

A further requirement is that the transmission system be immune to background and impulse noise. Impulse noise can be generated by power line transients, electrical fast transients, electrostatic discharge (ESD), and other sources.

Refer now to FIG. 1 for a discussion of near-end echo interference and near-end crosstalk. FIG. 1 shows a diagram of a gigabit Ethernet communications system. The gigabit Ethernet has two nodes that transmit and receive 1000 M bits per second (bps) full-duplex and bi-directionally. Each node consists of four transmitter/receivers (transceivers) 5a, 5b, 5c, 5d, 15a, 15b, 15c, and 15d that transmit 250 Mbps each.

Each transceiver 5a, . . . , 5d, 15a, . . . , 15d is connected to one end of one of four pair of unshielded twisted-pair cable 10a, 10b, 10c, and 10d. The transmitter 2 of each transceiver 5a, . . . , 5d, 15a, . . . , 15d forms a five level pulse amplitude modulated (PAM-5) shaped pulse signal that is transferred through the hybrid network 6 to one of the unshielded twisted-pair cable 10a, . . . , 10d. The transmitted signal traverses the unshielded twisted-pair cable 10a, . . . , 10d and is transferred through the hybrid network 6 to the receiver 4. The received signal is sensed, retimed, equalized and transferred to other circuitry for extraction of the digital data.

The full-duplex bi-directional transmission consists of transmitting and receiving data simultaneously in both directions on each of the four wire pairs, minimizing the symbol rate (and thus, the occupied signal bandwidth) on each wire pair by one half, as compared to unidirectional transmission and reception. The hybrid network 6 is used to enable bi-directional transmission over single wire pairs by filtering out the transmit signal at the receiver. The hybrid network 6 has good trans-hybrid loss to minimize the amount of transmitter signal that is coupled into the receiver 4, but it still cannot remove all of the transmitted signal from the adjacent transmitter 2. The residual transmitted signal from the adjacent transmitter 2 from the hybrid 6 is defined as the transmit echo signal 25.

Since the unshielded twisted-pair cable 10a, 10b, 10c, 10d are placed in close proximity to each other, often within the same cable, the crosstalk 20a, 20b, and 20c from transmitters within the same gigabit Ethernet node are coupled to the receiver 2. The near-end crosstalk 20a, 20b, and 20c and the transmit echo signal 25 must be cancelled from the receive signal to permit recovery of the transmitted signal.

Refer now to FIG. 2 for a more detailed discussion of the structure of a gigabit Ethernet node at one end of a bundled cable 10 containing four unshielded twisted-pair cable 10a, . . . , 10d. Each transmitter 4a, 4b, 4c, and 4d receives an encoded and scrambled symbol to be transmitted from the side-stream scrambler and symbol encoder 30, which in turn has received the digital data to be transferred from the Gigabit Media Independent Interface (GMII) 75. The digital transmit filter 35 shapes the symbol to be transmitted to condition the transmitted spectrum. The digital-to-analog converter 40 creates the five level pulse amplitude modulation signal that is then transferred to the hybrid network 6a for transmission on the unshielded twisted-pair cable 10a.

A similar pulse amplitude modulated signal is simultaneously transmitted from a transmitter connected at the opposite end of the unshielded twisted-pair cable 10a. The received signal is separated from the transmitted signal in the hybrid network 6a and is the input to the analog-to-digital converter 45. The digitized received signal is the feed-forward equalizer (FFE) 50 to compensate for signal distortion introduced in the communication channel. The feed-forward equalizer 50 combined with a feedback equalizer or decision feedback equalizer 80 often provides better signal equalization than linear equalization when the transmission medium (cable 10) introduces strong signal attenuation with specific frequency regions. The feed-forward equalizer 50 does not modify the noise (echo, crosstalk, etc.).

The input signals from the side-stream scrambler and symbol encoder 30 to each transmitter 2b, 2c, and 2d are the inputs to the near-end crosstalk cancellers 55a, 55b, and 55c and to the echo canceller 60. The near-end crosstalk cancellers 55a, 55b, and 55c and the echo canceller 60 reproduce the near-end echo interference and the near-end crosstalk interference that is present in the received signal. The outputs of the near-end crosstalk cancellers 55a, 55b, and 55c and the echo canceller 60 are the inputs to the summing circuit 65. The equalized digitized received signal is transferred from the feed-forward equalizer 50 to the summing circuit 65. The summing circuit 65 combines the reproduction of the echo interference and the near-end crosstalk interference and the equalized digitized received signal to cancel the echo interference signal and the near-end crosstalk signals induced to the received signal as described above.

The Viterbi decoder and side-stream descrambler 70 provide error correction and resequencing of the receive signal to recover the digital data that is transferred to the Gigabit Media Independent Interface (GMII) 75 for further processing.

The near-end echo canceller 60 and the crosstalk cancellers 55a, 55b, and 55c are known in the art and have been applied to applications such as 100 Base-T Ethernet, asynchronous transfer mode (ATM), local area networks (LAN), and telephone communication networks.

U.S. Pat. No. 4,995,104 (Gitlin) describes a receiver that includes an interference canceller, which receives a corrupted signal and makes an estimate of the desired signal, subtracts the estimated desired signal from a delayed version of the received signal to form an estimate of the interference signal, then forms a final estimate of the desired signal by subtracting the estimated interference from a second delayed version of the received signal.

U.S. Pat. No. 5,329,586 (Agazzi) teaches an echo canceling circuit and associated method for canceling errors encountered in data communications decomposing a lookup-table nonlinear echo canceller into a plurality of smaller lookup tables, and combining outputs of the lookup tables.

U.S. Pat. No. 5,887,032 (Cioffi) discusses a method and apparatus for crosstalk cancellation (e.g., NEXT interference) from received signals on a line by adaptively estimating the crosstalk interference from the other lines having interfering transmissions and by canceling the crosstalk interference using the estimated crosstalk interference.

U.S. Pat. No. 4,669,116 (Agazzi) discloses an echo cancellation circuit for use with full-duplex data transmission systems. The echo canceller can operate in spite of time invariant non-linearities in the echo channel or in the implementation of the echo canceller itself (such as in D/A converters).

"A Pipelined Adaptive NEXT Canceller" Im, et al., IEEE Transactions on Signal Processing, pp. 2252-2258, August 1998 Vol. 46 Issue: 8 ISSN: 1053-587X describes a near-end crosstalk (NEXT) canceller using a fine-grain pipelined architecture.

"100BASE-T2: 100 Mbit/S Ethernet Over Two Pairs Of Category-3 Cabling" Cherubini, et al., 1997 IEEE International Conference on Communications, pp. 1014-1018, 1997 Vol. 2, discusses the 100BASE-T2 physical layer specification for the receivers, particularly the adaptive digital filters that are required for echo and NEXT cancellation, equalization, and interference suppression.

As described above, near-end echo comes from the imperfections of the near-end hybrid network 6a that separates received signal from the transmitted signal and takes the significant part of the overall signal energy. The near-end echo signal degrades the receiver performance to a great extent and is a large source of error in the received signal. Therefore, the near-end echo canceller 60 is used to reduce the echo signal in the received signal. An adaptive echo cancellation technique is normally used because of its superior performance. For the receivers like gigabit Ethernet receivers, the performance requirement for the echo canceller is severe, and robustness of the received signal processing is required. Near-end crosstalk (NEXT), as described above, comes from the cross-coupling of the unshielded twisted-pair cable 10a, 10b, 10c, and 10d within a cable bundle and is one of the major sources of noise for the received signal.

In order to insure that the near-end echo and near-end crosstalk are minimized, a separate near-end echo/near-end crosstalk cancellation technique is necessary. The cancellation technique must not interact with other circuits in the receiver. In a receiver adopting a randomizing scrambler in the side-stream scrambler and symbol encoder 30, a correlator maybe used for the echo cancellation as shown in FIG. 3. A correlator 100 obtains the echo signal response for the transmitted symbols X(k) 115. Once the echo/NEXT signal response is acquired, a Finite Impulse Response (FIR) filter 105 set with the coefficients $C_0, \ldots, C_j$ 125 obtained by the correlator 100 generates the duplicated echo e (k) 135 and subtracts the duplicated echo/NEXT signal e(k) 135 from the received signal X(k) 115 at the receiver. The coefficients $C_0, \ldots, C_j$ 125 at the FIR 105 may be updated once they are set. However, the coefficients $C_0, \ldots, C_j$ 125 at the FIR 105 are not usually updated once set because it usually takes thousands of symbols to generate new coefficients $C_0, \ldots, C_j$ 125 from the received signal X(k) 115 in the correlator.

In a time varying echo/NEXT channel, such as the gigabit Ethernet, fixed coefficients $C_0, \ldots, C_j$ 125 cannot serve the purpose of the echo/NEXT cancellation since they cannot reflect the changes of the channel characteristics. Therefore, an update method for the coefficients $C_0, \ldots, C_j$ 125 is necessary. A windowed measurement for the coefficients $C_0, \ldots, C_j$ 125 is possible, but a more preferred way is to update the coefficients $C_0, \ldots, C_j$ 125 to reflect the most recent parameters of the channel.

Refer now to FIG. 4 for a discussion of the correlator 100. Each coefficient $C_0, \ldots, C_j$ 125 of the FIR filter 105 is the normalized product of the received signal and a delayed version of the transmitted symbol b(k) 120. That is $$C_j(k) = N(x(k) * b(k-j))$$

where:
  $C_j$ is the value of each coefficient 125 of the FIR filter 105;
  N is a normalizing factor for the coefficients 125;
  X(k) is the magnitude of the received signal 115; and
  b(k-j) is the magnitude of the delayed transmitted signal 120.

The multiplier circuit 150a, 150b, 150c, . . . , 150d receives the received signal X(k) 115 and the delayed transmitted signals b(k-j) 165a, 165b, 165c, . . . , 165d. The delayed transmitted signal b(k-j) 165a, 165b, 165c, ..., 165d is the transmitted signal b(k) 120 successively delayed through each of the unit delay elements 150a, 150b, 150c, ..., 150d. The product of the received signal X(k) 115 and the delayed transmitted signal 165a, 165b, 165c, ..., 165d is the output of the multiplier 150a, 150b, 150c, ..., 150d and the input of the normalization circuit 160a, 160b, 160c, ..., 160d. The product is normalized to form the coefficients $C_0$, $C_1$, $C_2$, ..., $C_j$ 125, by summing a large number of products and dividing the sum of the squares of the delayed transmitted signal b(k-j). Thus, each of the coefficients is determined as:

$$C_j = \frac{\sum_{k=0}^{n}(x(k) * b(k-j))}{\sum_{k=0}^{n}(b(k-j))^2}$$

where;

n is the number of symbols used to determine the coefficient $C_j$.

In the conventional prior art, the number of symbols n used to determine the coefficient $C_j$ is 1024. Therefore, for example, the first coefficient $C_0$ becomes $$C_0 = \frac{\sum_{k=0}^{1023}(x(k) * b(k))}{\sum_{k=0}^{1023}(b(k))^2}$$

SUMMARY OF THE INVENTION

An object of this invention is to provide a communication transmitting and receiving system in which the effects of near-end echo and near-end crosstalk from the communication medium are mitigated.

Another object of this invention is to provide an apparatus, which is included in a communication receiving system for adaptively reproducing the near-end echo and near-end crosstalk signal, which are then subtracted from the received signal to mitigate the effects of the near-end echo and near-end crosstalk.

Further, another object of this invention is to adaptively generate filter coefficients for a Finite Impulse Response filter to reproduce the near-end echo and near-end crosstalk.

To accomplish the above objects, an apparatus to cancel echo and crosstalk interference in a receiver of a communication system having simultaneous transmission and receiving on a communication medium includes an adaptive correlator and a finite impulse response filter. The adaptive correlator is connected to a receiving circuit to acquire received signals from the communication medium. Further, the adaptive correlator is connected to at least one of a plurality of transmission channels of the communication system to acquire at least one transmitted signal from the adjacent transmission channels. The adaptive correlator generates a reproduction of the echo response of the received signals to near-end echo and near-end crosstalk interference from the transmitted signals at an arrival of each received signal.

The finite impulse filter is connected to the receiving circuit to acquire the received signals, and is connected to the adaptive correlator to receive a plurality of filter coefficients. The finite impulse filter reproduces the near-end echo and near-end crosstalk signals from the received signals based on the values of the plurality of filter coefficients. The reproduced near-end echo or near-end crosstalk signals are combined with the received signals to cancel any echo and crosstalk interference from the received signals;

The filter coefficients are regenerated in the adaptive correlator at the arrival of each received signal and whereby each new filter coefficient is a weighted sum of a previous coefficient and one received signal multiplied by a time delayed version of one transmitted signal.

A first embodiment of the adaptive correlator has at least one first delaying means connected to one of the transmission channels to delay one of the transmitted signals. At least one first multiplying means is connected to the receiving circuit and one of the first delaying means to multiply the received signal by one delayed transmitted signal to produce a product of the received signals and the one delayed transmitted signal. At least one second multiplying means is connected to one of the first multiplying means to receive the product of the received signals multiplied by the one delayed transmitted signal and multiply this product by a first weighting factor $$\left(\frac{\beta}{\sigma^2}\right)$$

to produce a first intermediate coefficient factor.

The adaptive correlator has at least one second delaying means to delay and retain the previous coefficient. At least one third multiplying means is connected to one second delaying means to multiply the previous coefficient by one minus a second weighting factor (β) to produce a second intermediate coefficient factor. One of the second multiplying means and one of the third multiplying means is connected to one of a group of at least one summing means to add the first intermediate coefficient factor and the second intermediate coefficient factor to produce one new filter coefficient. The first weighting factor is a quotient of the second weighting factor divided by a variance ($\sigma^2$) of the transmitted signal. The second weighting factor β is chosen in a manner similar to an equivalent weighting factor used in to what is termed a leaky recursive least squares method to calculate the coefficients of an adaptive filter. For this embodiment of this invention, a number of the symbols n (for instance, n=256 symbols) is chosen and the weighting factor β is equal to the inverse of the number of the symbols. That is:

$$\beta = \frac{1}{n} = \frac{1}{256} \cong .004$$

The received signals and the transmitted signals are digitized to form binary numbers indicating magnitudes of samples of the received signal and the transmitted signal.

A second embodiment of the adaptive correlator has at least one first delaying means connected to one of the transmission channels to receive and delay on of the digitized samples of the transmitted signal and at least one first shifting means connected to the receiving circuit and one of the first delaying means to shift one of the digitized samples of the received signal according to the binary number of the one digitized sample of the delayed transmitted signal to produce the product of one received signal and the one time delayed transmitted signal. The adaptive correlator has at least one second shifting means to shift the product of the one received signal and the one time delayed transmitted signal by a first weighting factor $$\left(\frac{1}{\sigma^2}\right)$$

to form a weighted product of the one received signal and the one time delayed transmitted signal.

Further, the adaptive correlator has at least one second delaying means to delay and retain the previous coefficient. One adder/subtractor means of a group of at least one adder/subtractor means is connected to one second shifting means and one second delaying means to combine the previous coefficient with the weighted product to form a partially weighted sum. One third shifting means of a group of at least one third shifting means is connected to one adder/subtractor to shift the partially weighted sum by a second weighting factor ($\beta$) to form an intermediate weighted sum. One adding means of a group of at least one adding means is connected to one second delaying means and to one third shifting means to additively combine the partially weighted sum and the intermediate weighted sum to generate the new filter coefficient.

In the second embodiment, the first weighting factor is the inverse of the variance ($\sigma^2$) of the transmitted signal and the second weighting factor $\beta$, as described above, is chosen in a manner similar to an equivalent weighting factor used in to what is termed a leaky recursive least squares method to calculate the coefficients of an adaptive filter. For this embodiment of this invention, a number of the symbols n (for instance, n=256 symbols) is chosen and the weighting factor $\beta$ is equal to the inverse of the number of the symbols. That is:

$$\beta = \frac{1}{n} = \frac{1}{256} \cong .004$$

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 3:
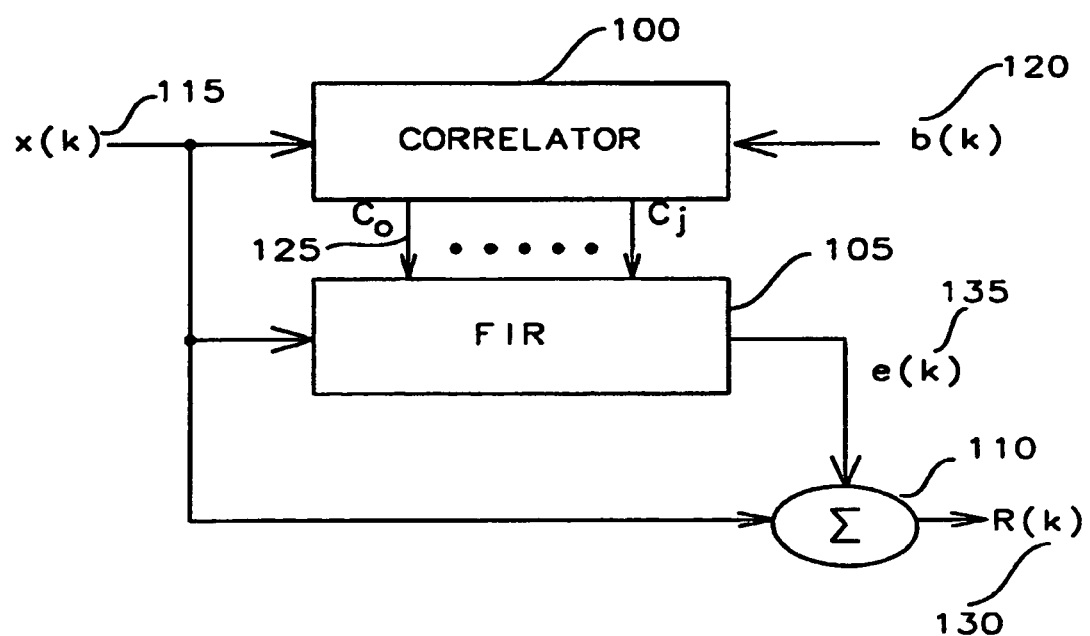
FIG. 3 is a block diagram of a near-end echo and near-end crosstalk canceller of the prior art.
Figure 4:
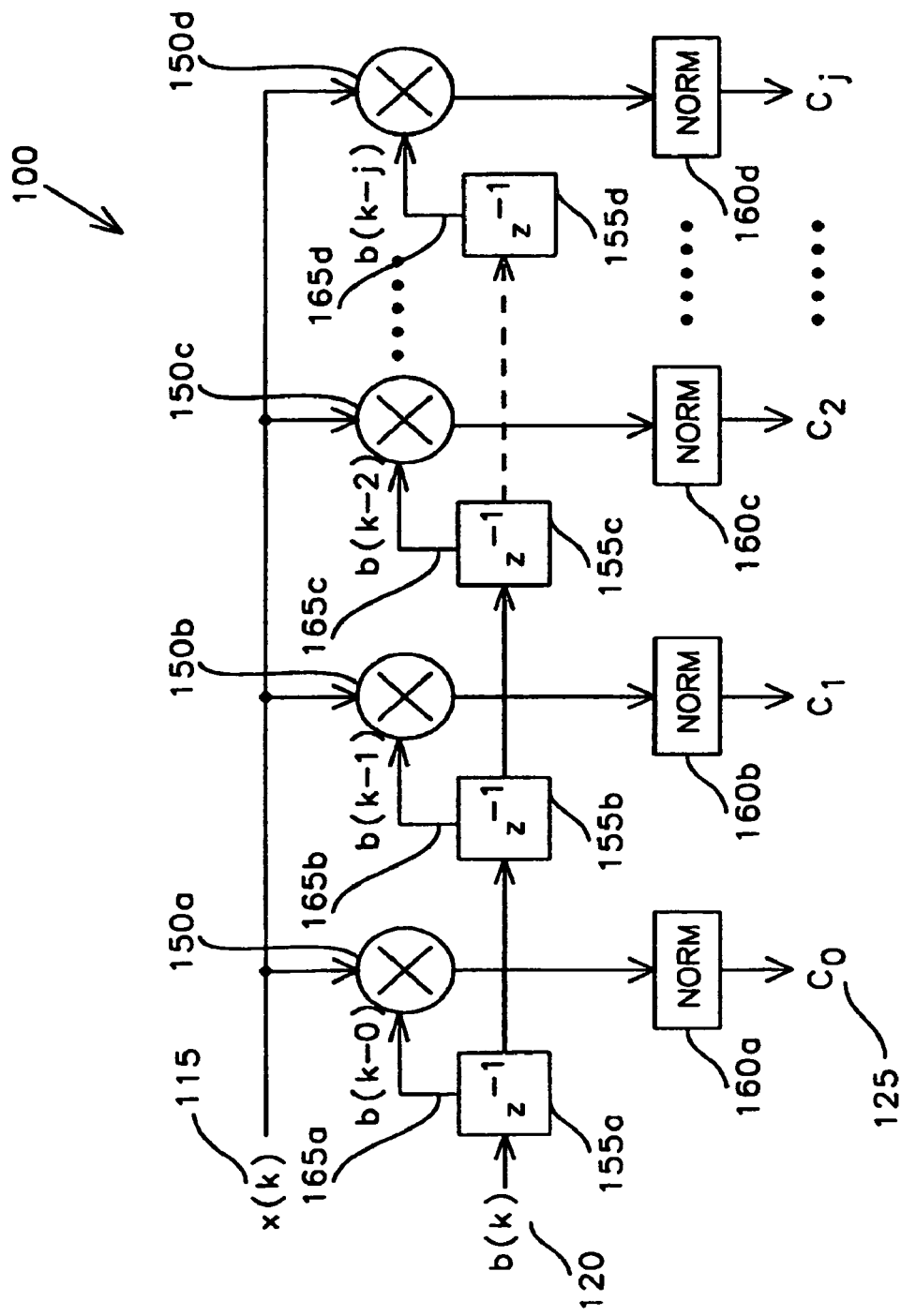
FIG. 4 is a schematic diagram of a correlator of the near-end echo and near-end crosstalk canceller of the prior art.

To meet the severe receiver requirements of the gigabit Ethernet, the near-end echo/near-end crosstalk canceller of this invention has a correlator 100 of FIG. 3 that creates each coefficient $C_0$, ..., $C_j$ 125 of the FIR filter 105 that is the function of the previous coefficient. Each coefficient $C_0$, ..., $C_j$ 125 is the weighted sum of the previous coefficient and the received signal X(k+1) 115 multiplied by a time delayed version of the transmitted symbol b(k) 120 and is summarized as follows:

$$C_j(k+1) = (1-\beta)*C_j(k) + \frac{\beta}{\sigma^2}*x(k+1)*b(k-j) \quad \text{EQ. 1}$$

where:
  $C_j(k)$ is the filter coefficient from the previous time period;
  Cj(k+1) is the filter coefficient for the FIR filter for the current time period;
  X(k+1) is the signal received during the current time period;
  b(k-j) is the transmitted signal delayed by j delay units;
  $\sigma^2$ is the variance of the transmitted symbol (e.g., for gigabit Ethernet, $\sigma^2$=2); and
  $\beta$ is a weighting factor.

The weighting factor $\beta$ is chosen in a manner similar to an equivalent weighting factor used in to what is termed a leaky recursive least squares method to calculate the coefficients of an adaptive filter. For this embodiment of this invention, a number of the symbols n (for instance, n=256 symbols) is chosen and the weighting factor $\beta$ is equal to the inverse of the number of the symbols. That is:

$$\beta = \frac{1}{n} = \frac{1}{256} \cong .004$$

Figure 5:
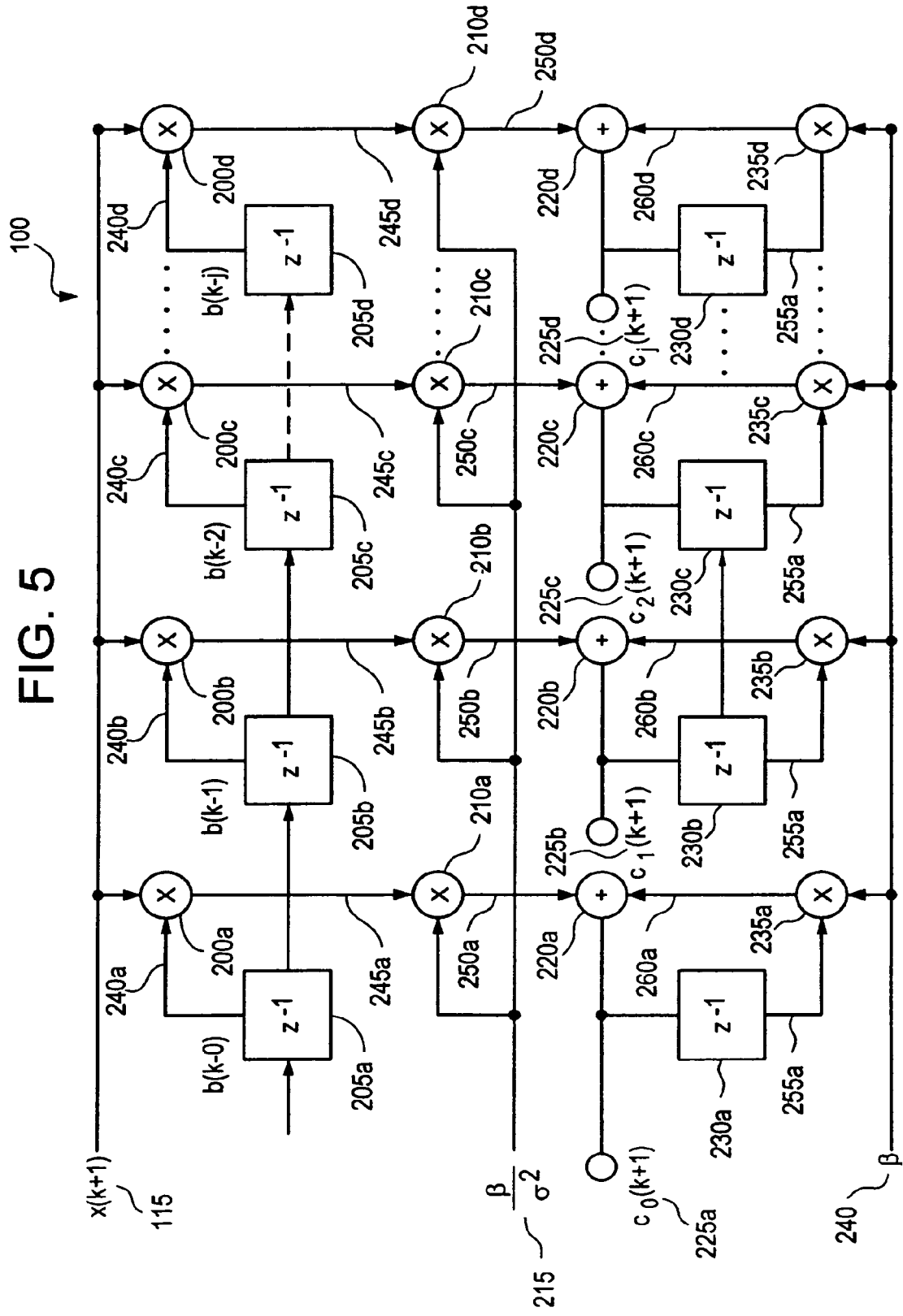
FIG. 5 is a schematic diagram of a first embodiment of a correlator of a near-end echo canceller and a near-end crosstalk canceller of this invention.

Refer now to FIG. 5 for a discussion of a first embodiment of the correlator 100 circuit of the near-end echo/near-end crosstalk cancellation circuit of this invention. The received signal X(k+1) 115 and the delayed transmitted signals b(k-j) 240a, 240b, 240c, ..., 240d are the inputs to each of the first multipliers 200a, 200b, 200c, ..., 200d. The delayed transmitted signals b(k-j) are the outputs of each of the unit delay elements 205a, 205b, 205c, ..., 205d. The unit delay elements 205a, 205b, 205c, ..., 205d successively delay the transmitted signal b(k) 120 to form the delayed transmitted signals b(k-j) 240a, 240b, 240c, ..., 240d.

The output products 245a, 245b, 245c, ..., 245d and the first weighting factor $$\left(\frac{\beta}{\sigma^2}\right)$$

215 are inputs to the second multipliers 210a, 210b, 210c, ..., 210d. The outputs of the second multipliers 210a, 210b, 210c, ..., 210d form the weighted products 250a, 250b, 250c, ..., 250d.

Each of the new filter coefficients $C_0$ (k+1), ..., Cj(k+1) 225a, 225b, 225c, ..., 225d is the input to each of the unit delay elements 230a, 230b, 230c, ..., 230d to form the previous filter coefficients 255a, 255b, 255c, ..., 255d. A second weighting coefficient (β) 240 and the previous filter coefficients 255a, 255b, 255c, ..., 255d are the inputs to the third multipliers 235a, 235b, 235c, ..., 235d. The outputs of the third multipliers 235a, 235b, 235c, ..., 235d form the weighted previous filter coefficients 260a, 260b, 260c, ..., 260d.

The weighted products 250a, 250b, 250c, ..., 250d and the weighted previous filter coefficients 260a, 260b, 260c, ..., 260d are respectively the inputs to the summing circuits 220a, 220b, 220c, ..., 220d to be additively combined to form the new filter coefficients Cj(k+1) 225a, 225b, 225c, ..., 225d. The new filter coefficients Cj(k+1) 225a, 225b, 225c, ..., 225d are placed at the inputs 125 of the FIR filter 105 of FIG. 3 to set the FIR filter 105 to reproduce the near-end echo/near-end crosstalk for the received signal X(k+1) 115 at a next instant.

It can be shown that the function of EQ. 1 can be rewritten to the form:

$$C_j(k+1) = C_j(k) + \beta\left(\frac{x(k+1)*b(k-j)}{\sigma^2} - C_j(k)\right) \quad \text{EQ. 2}$$

As described above, the weighting factor β is chosen in a manner similar to an equivalent weighting factor used in to what is termed a leaky recursive least squares method to calculate the coefficients of an adaptive filter. For this embodiment of this invention, a number of the symbols n (for instance, n=256 symbols) is chosen and the weighting factor β is equal to the inverse of the number of the symbols. That is:

$$\beta = \frac{1}{n} = \frac{1}{256} \cong .004$$

Figure 6:
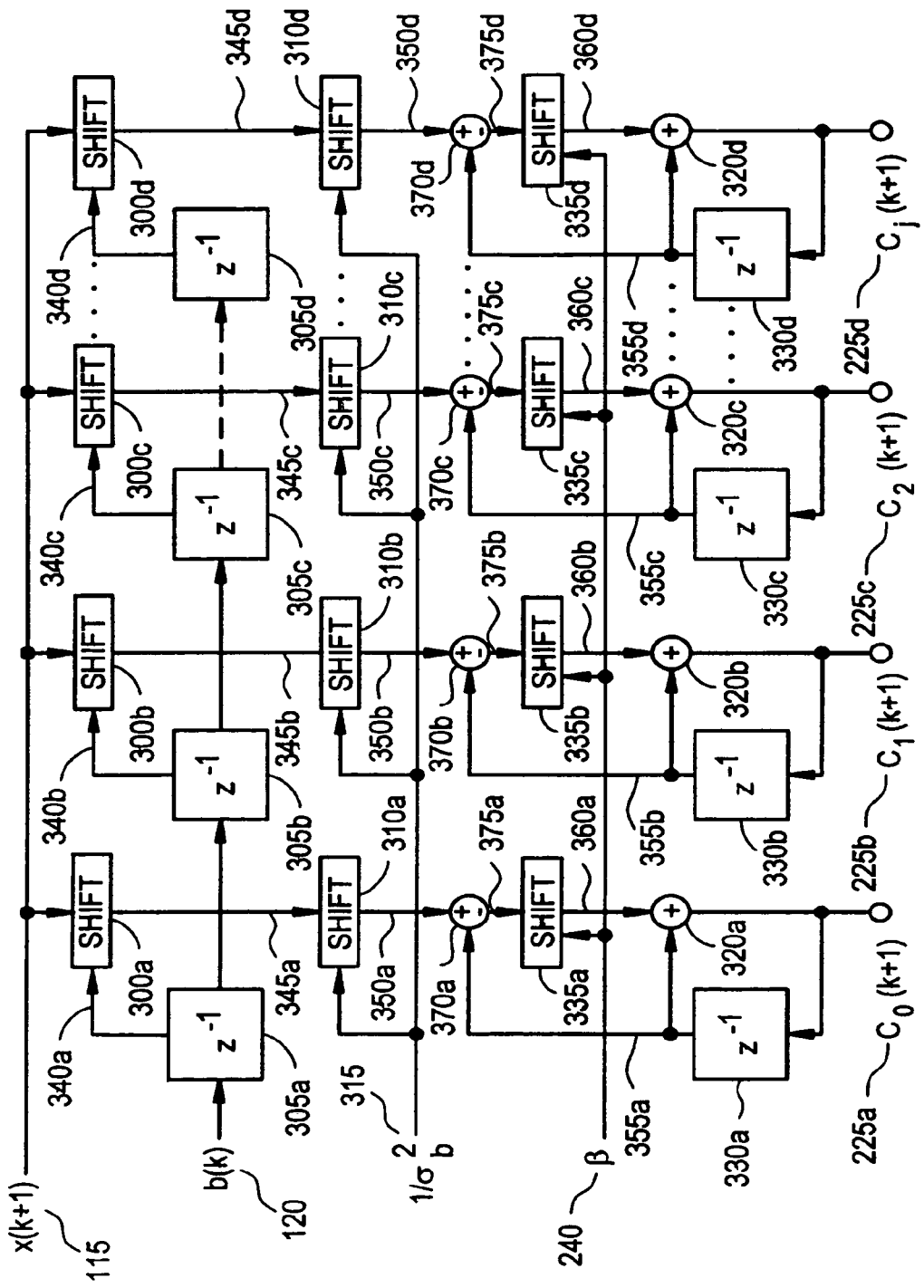
FIG. 6 is a schematic diagram of a second embodiment of a correlator of a near-end echo canceller and a near-end crosstalk canceller of this invention.

Since the transmit signals b(k) 120 and the received signals X(k+1) 115 are digitized samples of the signals transmitted and received on the communication medium (cable 10 of FIG. 2), the multiplication can be performed with shift registers. Refer now to FIG. 6 for a discussion of a correlator 100 of a second embodiment of the near-end echo/near-end crosstalk canceller of this invention.

The digital form of the transmitted symbol b(k) is the input to each of the first unit delay elements 305a, 305b, 305c, ..., 305d to form the delayed transmitted symbols 340a, 340b, 340c, ..., 340d. The sampled digitized received signal 115 and the delayed transmitted signals 340a, 340b, 340c, ..., 340d are the inputs to the first shifters 300a, 300b, 300c, ..., 300d. The first shifters 300a, 300b, 300c, ..., 300d shift the sampled digitized received signal 115 according to the values of the delayed transmitted signals 340a, 340b, 340c, ..., 340d to form the output products 345a, 345b, 345c, ..., 345d.

The output products 345a, 345b, 345c, ..., 345d and a first weighting factor 315 are the inputs respectively to the second shifters 310a, 310b, 310c, ..., 310d. The first weighting factor 315 in this embodiment is the inverse of the variance ($\sigma^2$) of transmitted symbols. As described before, for gigabit Ethernet the variance of the transmitted symbols ($\sigma^2$) is 2.

The second shifters 310a, 310b, 310c, ..., 310d each shift the output products 345a, 345b, 345c, ..., 345d according to the binary value of the first weighting factor $$\left(\frac{1}{\sigma^2}\right)$$

to form the weighted products 350a, 350b, 350c, ..., 350d.

The new filter coefficients Cj(k+1) 325a, 325b, 325c, ..., 325d are the inputs to the second delay elements 330a, 330b, 330c, ..., 330d. The new filter coefficients Cj(k+1) 325a, 325b, 325c, ..., 325d are delayed and retained for one timing cycle to become the previous filter coefficients 355a, 355b, 355c, ..., 355d.

The weighted products 350a, 350b, 350c, ..., 350d and the previous filter coefficients 355a, 355b, 355c, ..., 355d are subtractively combined in the arithmetic combining circuits 370a, 370b, 370c, ..., 370d to form the preliminary weighted sums 375a, 375b, 375c, ..., 375d. The preliminary weighted sums 375a, 375b, 375c, ..., 375d and the previous coefficients 355a, 355b, 355c, ..., 355d are the input to the summing circuits 320a, 320b, 320c, ..., 320d where they are additively combined to form the new filter coefficients $C_0$(k+1), $C_1$(k+1), $C_2$(k+1), ..., Cj(k+1) 225a, 225b, 225c, ..., 225d. The new filter coefficients $C_0$(k+1), $C_1$(k+1), $C_2$(k+1), ..., Cj(k+1) 225a, 225b, 225c, ..., 225d, as stated prior, are the inputs 125 to the FIR filter 105 of FIG. 3, to set the FIR filter 105 to reproduce the near-end echo/near-end crosstalk for the received signal X(k+1) 115 at the next digitized sample of the received signal X(k+1) 115.

Figure 1:
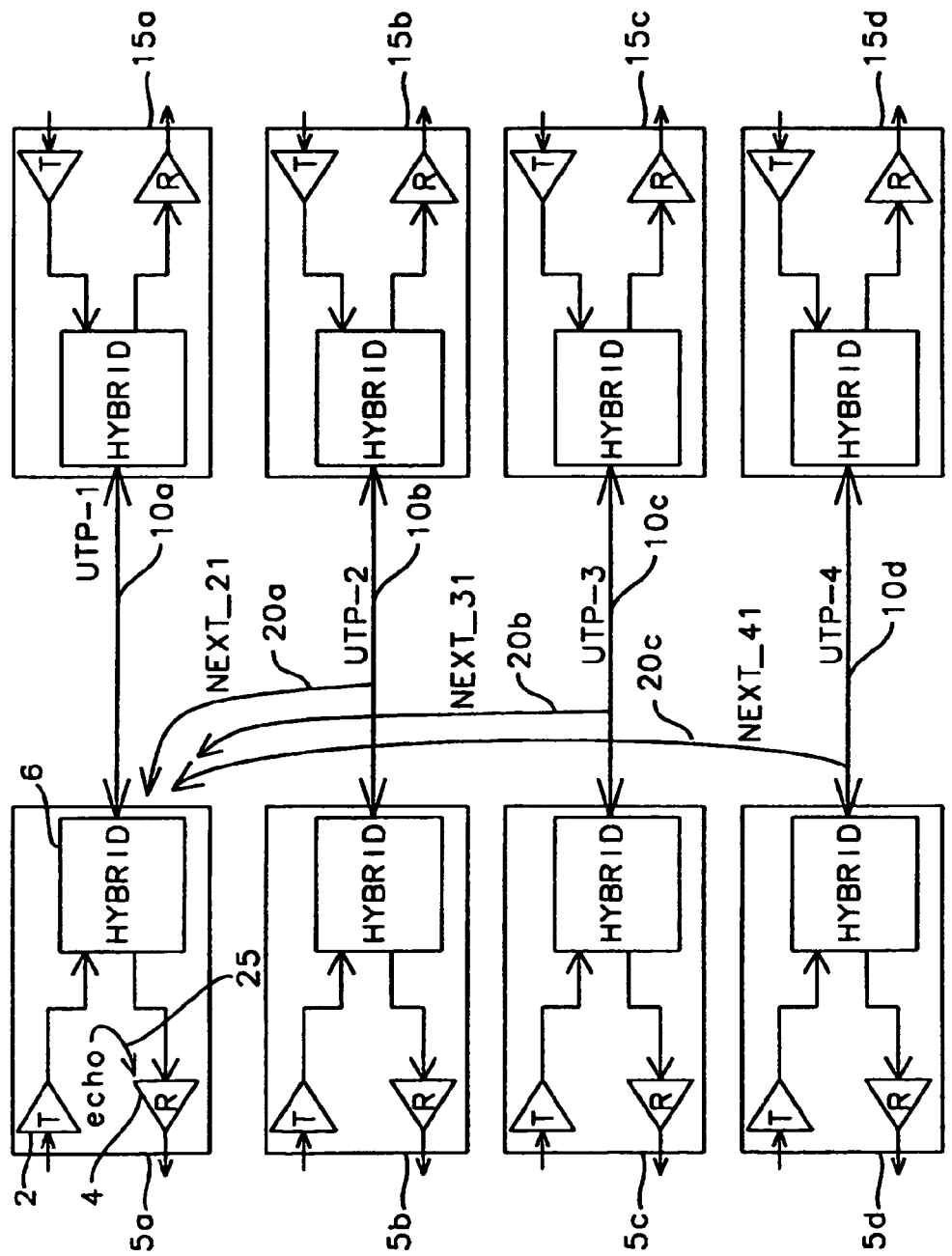
FIG. 1 is a simplified diagram of the basic structure of a gigabit Ethernet communication link of the prior art.
Figure 2:
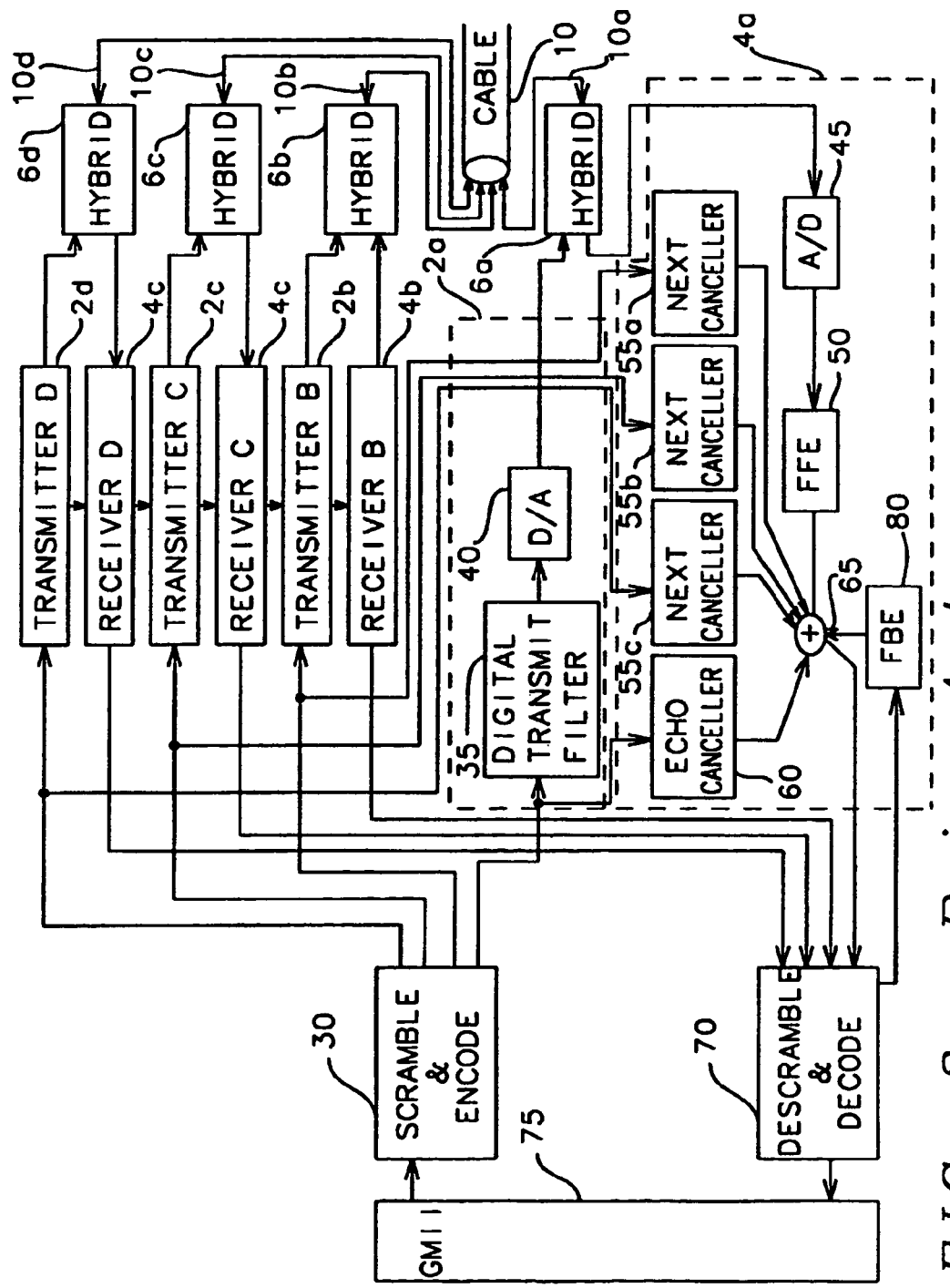
FIG. 2 is a block diagram of a transceiver of a gigabit Ethernet communication system of the prior art.
Figure 7A:
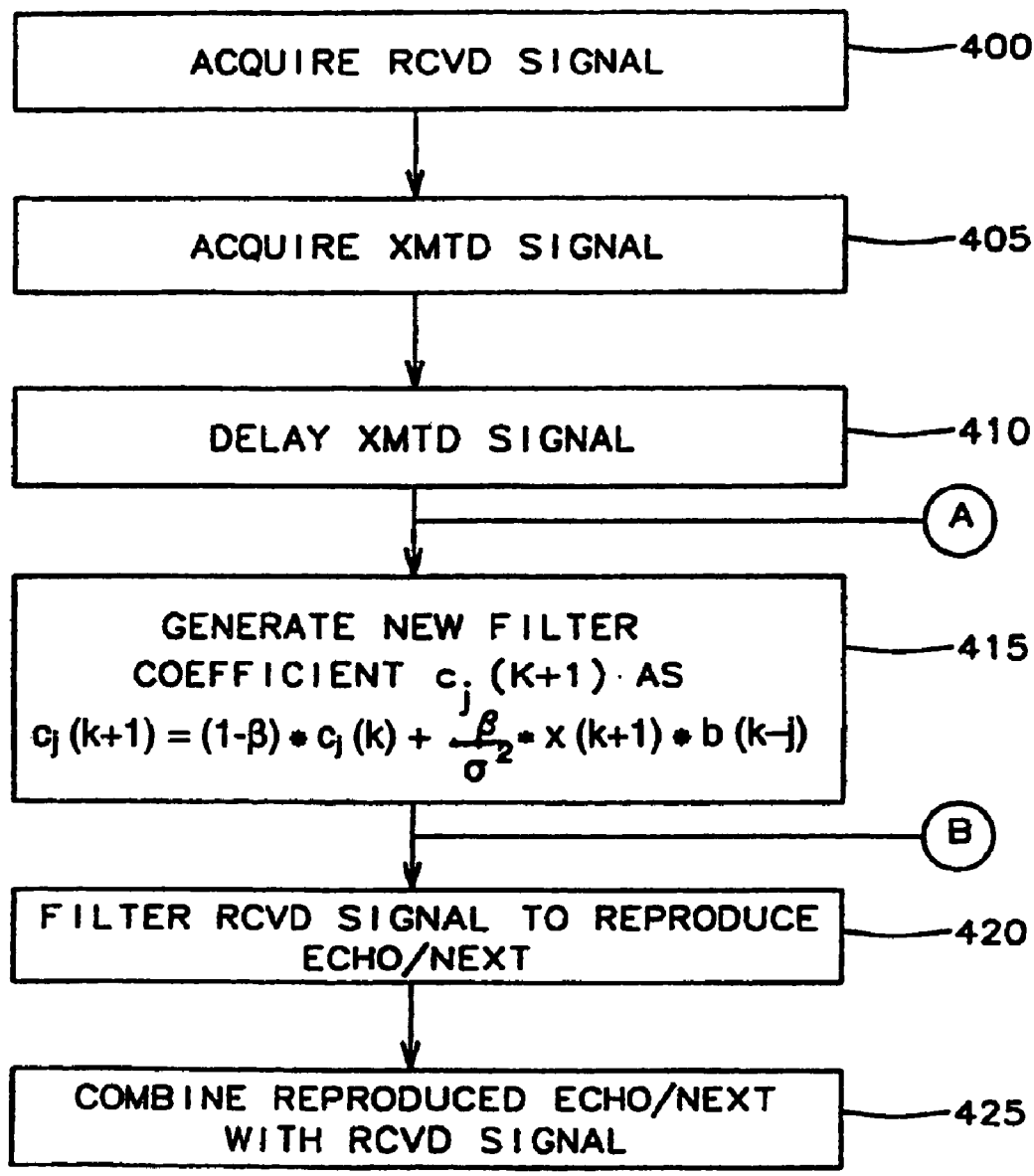
FIGS. 7a-7c are flow diagrams of embodiments of the method to cancel near-end echo/near-end crosstalk from a received signal in a communication system of this invention.
Figure 7B:
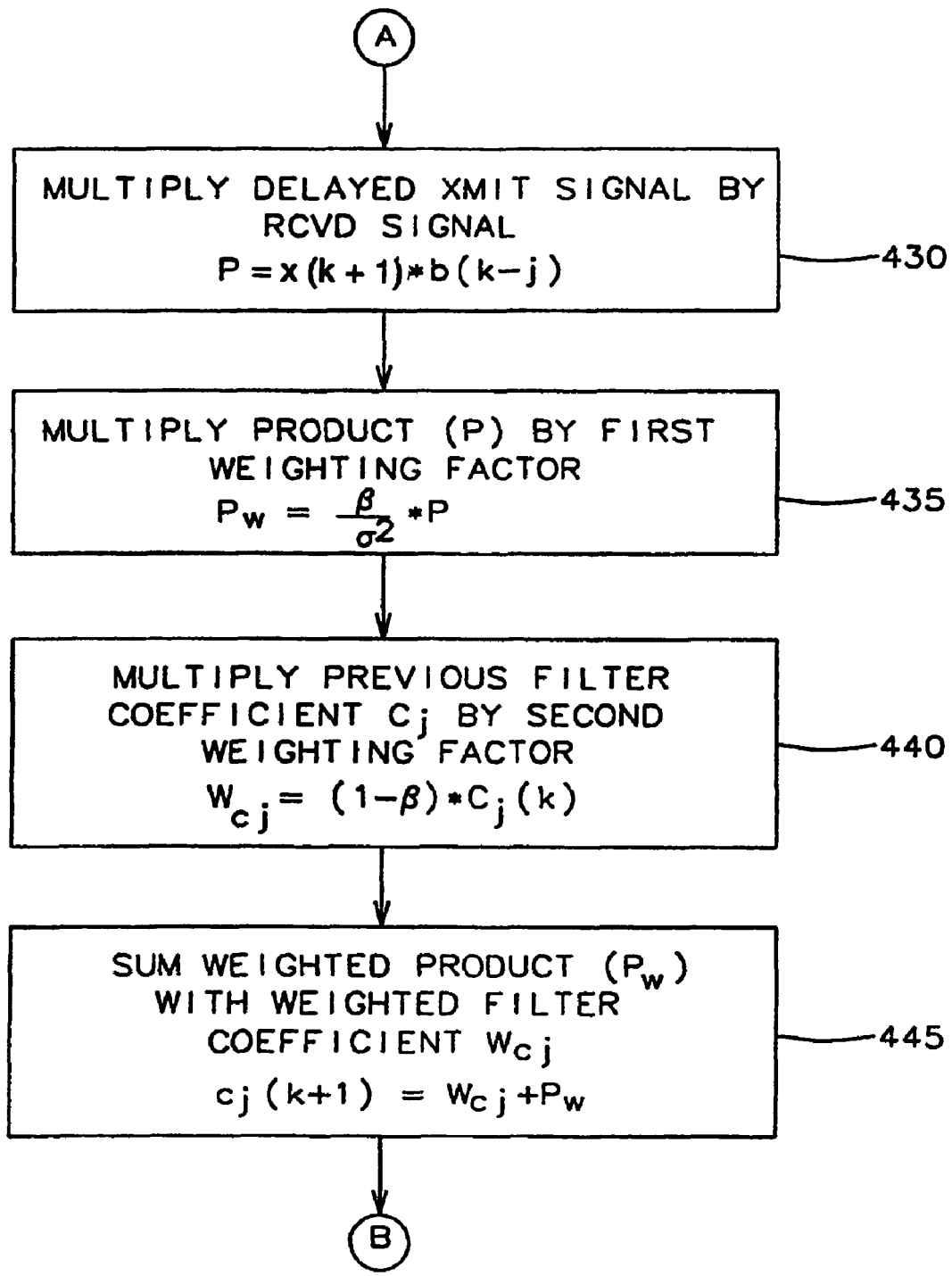
Figure 7C:
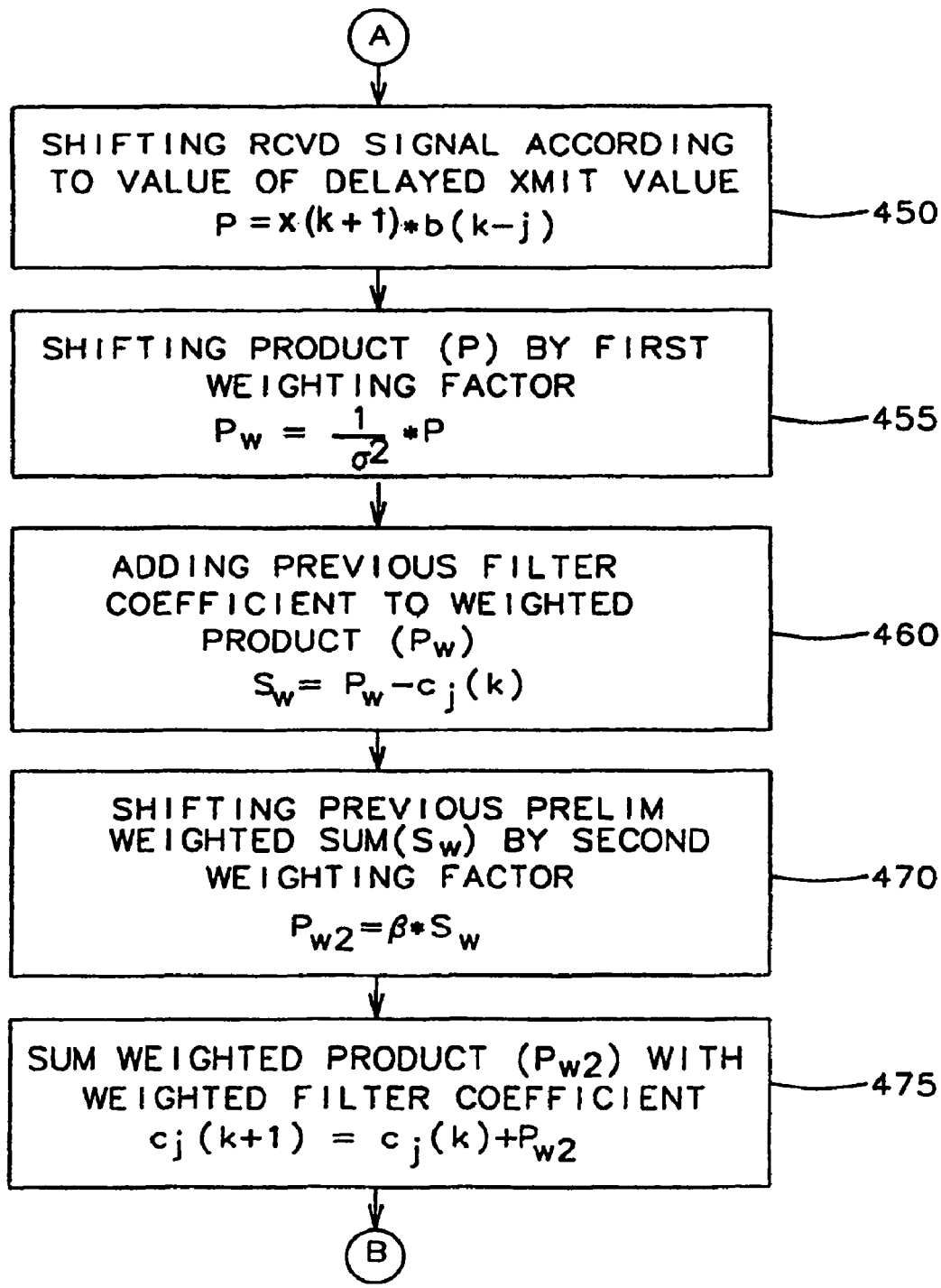

Since the transmit symbols and the received signals are digital words that respectively are inputs to the digital-to-analog converter 40 of FIG. 2 and outputs from the analog-to-digital converter 45 of FIG. 2, it is possible to perform the reproduction of the near-end echo/near-end crosstalk as digital words within a computer system such as a digital signal processor. A method to cancel near-end echo interference and near-end crosstalk interference that is implemented in a digital signal processor is illustrated in FIGS. 7 a-c.

A method to cancel echo interference and crosstalk interference present in a received signal from a communication medium begins with acquiring 400 the received signal with the echo interference and the crosstalk interference and acquiring 405 the transmitted signals that generate the echo interference and the crosstalk interference. The transmitted signal is then delayed 410 to form a delayed transmitted signal. The received signal is then correlated with at least one transmitted signal at each cycle of the received signal to generate 415 a new filter coefficient as a weighted sum of a previous filter coefficient and the received signal multiplied by the delayed transmitted signal. The received signal is then filtered 420 to reproduce the echo interference and the crosstalk interference. The reproduction of the echo interference and the crosstalk interference are received combined 425 with the received signal to cancel the echo interference and the crosstalk interference in the received signal.

A first embodiment of the correlating of the received signal begins with at least one transmit signal to generate 415 the new filter coefficients begins by multiplying the delayed signal by at least one of the transmitted signals to form a first product. The first product is then multiplied 435 by a first weighting factor $$\left(\frac{\beta}{\sigma^2}\right)$$

to form a first weighted product.

The previous filter coefficient are multiplied 440 by a second weighting factor (β) to form a second weighted product. The first weighted product and the second weighted product are then summed 445 to form the weighted sum. The first weighting factor is the quotient of the factor (β) divided by the variance of the transmitted signal ($\sigma^2$). As stated above the variance ($\sigma^2$) of the transmitted signal for gigabit Ethernet is 2. The second weighting factor is one minus the factor (β).

As previously described, the weighting factor is chosen in a manner similar to an equivalent weighting factor used in to what is termed a leaky recursive least squares method to calculate the coefficients of an adaptive filter. For this embodiment of this invention, a number of the symbols n (for instance, n=256 symbols) is chosen and the weighting factor β is equal to the inverse of the number of the symbols. That is:

$$\beta = \frac{1}{n} = \frac{1}{256} \cong .004$$

A second embodiment of the correlating the received signal with at least one transmit signal to generate 415 the new filter coefficient begins by shifting 450 the received signal according to the delayed transmit signal to form a product of the received signal and the delayed transmit signal. The product of the received signal and the delayed transmit signal is further shifted 455 according to a first weighting factor $$\left(\frac{1}{\sigma^2}\right)$$

to form a first weighted product. The first weighted product is additively combined with the previous filter coefficient to form a first preliminary weighted sum.

The first preliminary weighted sum is then shifted 470 by a second weighting factor (β) to form a second weighted product. The second weighted product and the previous filter coefficient are then additively combined 475 to generate the new filter coefficient.

In the second embodiment, the first weighting factor is the inverse of the variance ($\sigma^2$) of the transmitted signal and the second weighting factor is the factor β.

The second weighting factor β is chosen, as above described, in a manner similar to an equivalent weighting factor used in to what is termed a leaky recursive least squares method to calculate the coefficients of an adaptive filter. For this embodiment of this invention, a number of the symbols n (for instance, n=256 symbols) is chosen and the weighting factor β is equal to the inverse of the number of the symbols. That is:

$$\beta = \frac{1}{n} = \frac{1}{256} \cong .004$$

While this invention has been particularly shown and described with reference to the preferred embodiments thereof, it will be understood by those skilled in the art that various changes in form and details may be made without departing from the spirit and scope of the invention.

What is claimed is:

1. An apparatus for removing interference in a communication system, the communication system including a receiver and a transmitter for simultaneous reception from and transmission to a communication medium, the apparatus comprising:
   an adaptive correlator in communication with the communication medium, the adaptive correlator configured to generate, for each period of time, a plurality of filter coefficients representing interference in a signal received by the receiver during the period of time, wherein the plurality of filter coefficients for a current time period comprise a weighted sum of
      corresponding coefficients from a previous time period weighted by one minus a first predetermined weighting factor, and
      a product of (i) a signal received by the receiver during the current period and (ii) a signal previously transmitted by the transmitter delayed by a predetermined time, the product being weighted by a second predetermined weighting factor comprising a quotient of the first predetermined weighting factor divided by a variance of the signal previously transmitted by the transmitter; and
   a combining device in communication with the receiver, the combining device configured to remove the interference from the signal received by the receiver during the current period in accordance with the plurality of filter coefficients generated by the adaptive correlator for the current period.

2. The apparatus of claim 1, wherein the adaptive correlator comprises:
   a first delay circuit configured to delay the signal previously transmitted by the transmitter;
   a first multiplier configured to multiply the signal received by the receiver during the current period with an output of the first delay circuit;
   a second multiplier configured to multiply an output of the first multiplier by the first predetermined weighting factor;
   a first adder;
   a second delay circuit configured to delay an output of the first adder; and
   a third multiplier configured to multiply an output of the second delay circuit by the second predetermined weighting factor,
      wherein the first adder is configured to add an output of the second multiplier to an output of the third multiplier.

3. The apparatus of claim 1, wherein the adaptive correlator comprises:
   a first delay circuit configured to delay the signal previously transmitted by the transmitter;
   a first shifter configured to shift the signal received by the receiver during the current period in accordance with an output of the first delay circuit;
   a second shifter configured to shift an output of the first shifter in accordance with the first predetermined weighting factor;
   a first adder;
   a third shifter configured to shift an output of the first adder in accordance with the second predetermined weighting factor;
   a second adder; and
   a second delay circuit configured to delay an output of the second adder,
      wherein the first adder is configured to add an output of the second shifter to an output of the second delay circuit, and wherein the second adder is configured to add an output of the third shifter to the output of the second delay circuit.

4. The apparatus of claim 3, wherein the first predetermined weighting factor comprises an inverse of a number of groups of the signals previously transmitted by the transmitter.

5. The apparatus of claim 1, wherein each of the plurality of filter coefficients is generated according to the formula:

$$C_j(k+1) = (1-\beta) * C_j(k) + \frac{\beta}{\sigma^2} * x(k+1) * b(k-j)$$

wherein:
- $C_j(k)$ is the filter coefficient from the previous time period,
- $C_j(k+1)$ is the filter coefficient for the current time period,
- $x(k+1)$ is the signal received by the receiver during the current period,
- $b(k-j)$ is the signal previously transmitted by the transmitter delayed by j delay units,
- $(1-\beta)$ is a first leakage factor,
- $\sigma^2$ is the variance of the signal previously transmitted by the transmitter,
- $\beta/\sigma^2$ is a second leakage factor that corresponds to the second predetermined weighting factor, and
- $\beta$ is a predetermined weighting factor.

6. The apparatus of claim 5, wherein $\beta$ is equal to an inverse of a number of previously transmitted symbols.

7. A method of removing interference from a signal, the method comprising the steps of:
   a.) for each period of time, generating a plurality of filter coefficients representing interference in a signal received during the period of time,
   wherein the plurality of filter coefficients for a current time period comprises a weighted sum of
   corresponding coefficients from a previous time period weighted by weighted by one minus a first predetermined weighting factor, and
   a product of (i) a signal received during the current period and (ii) a previously transmitted signal delayed by a predetermined time, the product being weighted by a second predetermined weighting factor comprising a quotient of the first predetermined weighting factor divided by a variance of the signal previously transmitted by the transmitter; and
   b.) finite impulse filtering the received signal in accordance with the plurality of filter coefficients generated in step (a) to remove the interference from the signal during the current period.

8. The method of claim 7, wherein step (a) comprises the steps of:
   c.) delaying the previously transmitted signal;
   d.) multiplying the signal received during the current period with the delayed signal from step (c);
   e.) multiplying an output of step (d) by the first predetermined weighting factor;
   f.) adding an output of step (e) to an output of step (h);
   g.) delaying an output of step (f); and
   h.) multiplying an output of step (g) by the second predetermined weighting factor.

9. The method of claim 7, wherein step (a) comprises the steps of:
   c.) delaying the previously transmitted signal;
   d.) shifting the signal received during the current period in accordance with an output of step (c);
   e.) shifting an output of step (d) in accordance with the first predetermined weighting factor;
   f.) adding an output of step (e) to an output of step (i);
   g.) shifting an output of step (f) in accordance with the second predetermined weighting factor;
   h.) adding the output of step (i) to an output of step (g); and
   i.) delaying an output of step (h).

10. The method of claim 6, wherein the first predetermined weighting factor comprises an inverse of a number of groups of previously transmitted signals.

11. The method of claim 7, wherein each of the plurality of filter coefficients is generated in step (a) according to the formula:

$$C_j(k+1) = (1-\beta) * C_j(k) + \frac{\beta}{\sigma^2} * x(k+1) * b(k-j)$$

wherein:
- $C_j(k)$ is the filter coefficient from the previous time period,
- $C_j(k+1)$ is the filter coefficient for the current time period,
- $x(k+1)$ is the signal received during the current period,
- $b(k-j)$ is the previously transmitted signal delayed by j delay units,
- $(1-\beta)$ is a first leakage factor,
- $\sigma^2$ is the variance of the signal previously transmitted by the transmitter,
- $\beta/\sigma^2$ is a second leakage factor that corresponds to the second predetermined weighting factor, and
- $\beta$ is a predetermined weighting factor.

12. The method of claim 11, wherein $\beta$ is equal to an inverse of a number of previously transmitted symbols.

13. An apparatus for removing near-end interference in a communication system, the communication system including a receiver and a transmitter for simultaneous reception from and transmission to a communication medium, the apparatus comprising:
   an adaptive correlator in communication with the receiver and the transmitter, the adaptive correlator comprising:
      a Least Mean Square (LMS) engine configured to generate a plurality of filter coefficients each time period, wherein the plurality of filter coefficients for a current time period comprise a sum of
         a corresponding coefficient from a previous time period weighted by a first leakage factor, and
         a product of (i) a signal received by the receiver during the current time period and (ii) a time-delayed version of a signal previously transmitted by the transmitter, wherein the product is weighted by a second leakage factor, the second leakage factor comprising a quotient of the first leakage factor divided solely by a variance of the signal previously transmitted by the transmitter;
   a Finite Impulse Response (FIR) filter in communication with the receiver and the adaptive correlator, wherein the FIR filter is configured to reproduce the near-end interference in the signal received by the receiver during the current time period in accordance with the plurality of filter coefficients generated by the adaptive correlator for the current time period; and a combining circuit in communication with the receiver and the FIR filter, wherein the combining circuit is configured to subtract the reproduced near-end interference from the signal received by the receiver during the current time period.

14. The apparatus of claim 13, wherein each of the plurality of filter coefficients is generated according to the formula:

$$C_j(k+1) = (1-\beta)*C_j(k) + \frac{\beta}{\sigma^2}*x(k+1)*b(k-j)$$

wherein:
- $C_j(k)$ is the filter coefficient from the previous time period,
- $Cj(k+1)$ is the filter coefficient for the current time period,
- $x(k+1)$ is the signal received by the receiver during the current time period,
- $b(k-j)$ is the signal previously transmitted by the transmitter delayed by j delay units,
- $(1-\beta)$ is the first leakage factor,
- $\sigma^2$ is the variance of the signal previously transmitted symbol by the transmitter,
- $\beta/\sigma^2$ is the second leakage factor, and
- $\beta$ is a predetermined weighting factor.

15. The apparatus of claim 14, wherein $\beta$ is equal to an inverse of a number of previously transmitted symbols.

16. An apparatus for removing near-end interference in a communication system, the communication system including a receiver and a transmitter for simultaneous reception from and transmission to a communication medium, the apparatus comprising:
- a Least Mean Square (LMS) engine, in communication with the receiver and the transmitter, the LMS engine configured to generate a plurality of filter coefficients each time period, wherein the plurality of filter coefficients for a current time period comprise a sum of
  - a corresponding coefficient from a previous time period weighted by a first leakage factor, and
  - a product of (i) a signal received by the receiver during the current time period and (ii) a time-delayed version of a signal previously transmitted by the transmitter, wherein the product is weighted by a second leakage factor, the second leakage factor comprising a quotient of the first leakage factor divided solely by a variance of the signal previously transmitted by the transmitter.

17. The apparatus of claim 16, comprising:
a Finite Impulse Response (FIR) filter in communication with the receiver and the LMS engine,
  wherein the FIR filter is configured to reproduce the near-end interference in the signal received by the receiver in accordance with the plurality of filter coefficients generated by the LMS engine; and
a combining circuit in communication with the receiver and the FIR filter,
  wherein the combining circuit is configured to subtract the reproduced near-end interference from the signal received by the receiver.

18. The apparatus of claim 16, wherein each of the plurality of filter coefficients is generated according to the formula:

$$C_j(k+1) = (1-\beta)*C_j(k) + \frac{\beta}{\sigma^2}*x(k+1)*b(k-j)$$

wherein:
- $C_j(k)$ is the filter coefficient from the previous time period,
- $Cj(k+1)$ is the filter coefficient for the current time period,
- $x(k+1)$ is the signal received by the receiver during the current time period,
- $b(k-j)$ is the signal previously transmitted by the transmitter delayed by j delay units,
- $(1-\beta)$ is the first leakage factor,
- $\sigma^2$ is the variance of the signal previously transmitted by the transmitter,
- $\beta/\sigma^2$ is the second leakage factor, and
- $\beta$ is a predetermined weighting factor.

19. The apparatus of claim 18, wherein $\beta$ is equal to an inverse of a number of previously transmitted symbols.

20. An apparatus for removing near-end interference in a communication system, the communication system including a receiver and a transmitter for simultaneous reception from and transmission to a communication medium, the apparatus comprising:
a Least Mean Square (LMS) engine, in communication with the receiver and the transmitter, the LMS engine configured to generate a plurality of filter coefficients each time period,
wherein each of the plurality of filter coefficients is generated according to the formula:

$$C_j(k+1) = (1-\beta)*C_j(k) + \frac{\beta}{\sigma^2}*x(k+1)*b(k-j)$$

wherein:
- $C_j(k)$ is the filter coefficient from a previous time period,
- $Cj(k+1)$ is the filter coefficient for a current time period,
- $x(k+1)$ is a signal received by the receiver during the current time period,
- $b(k-j)$ is the signal previously transmitted by the transmitter delayed by j delay units,
- $(1-\beta)$ is a first leakage factor,
- $\sigma^2$ is a variance of a previously transmitted symbol,
- $\beta/\sigma^2$ is a second leakage factor, and
- $\beta$ is a predetermined weighting factor.

21. The apparatus of claim 20, comprising:
a Finite Impulse Response (FIR) filter in communication with the receiver and the LMS engine,
  wherein the FIR filter is configured to reproduce the near-end interference in the signal received by the receiver during the current time period in accordance with the plurality of filter coefficients generated by the LMS engine for the current time period; and
a combining circuit in communication with the receiver and the FIR filter,
  wherein the combining circuit is configured to subtract the reproduced near-end interference from the signal received by the receiver during the current time period.

22. The apparatus of claim 20, wherein β is equal to an inverse of a number of previously transmitted symbols.

23. A method of removing near-end interference from a signal, the method comprising the steps of:
a) for each time period, generating a plurality of filter coefficients representing the near-end interference in a signal received during the time period according to the formula:

$$C_j(k+1) = (1-\beta) * C_j(k) + \frac{\beta}{\sigma^2} * x(k+1) * b(k-j)$$

wherein:
$C_j(k)$ is the filter coefficient from a previous time period,
Cj(k+1) is the filter coefficient for a current time period,
x(k+1) is the signal received during the current time period,
b(k-j) is a previously transmitted signal delayed by j delay units,
(1-β) is a first leakage factor,
$\sigma^2$ is a variance of a previously transmitted symbol,
$\beta/\sigma^2$ is a second leakage factor, and
β is a predetermined weighting factor; and
b) finite impulse filtering a signal received during the current time period in accordance with the plurality of filter coefficients generated in step (a) to remove the near-end interference from the signal received during the current time period.

24. The method of claim 23, wherein β is equal to an inverse of a number of previously transmitted symbols.

25. A method of removing near-end interference from signal, the method comprising the step of:
a) for each time period, generating a plurality of filter coefficients representing the near-end interference in a signal received during the time period, wherein the plurality of filter coefficients for a current time period comprise a sum of
a corresponding coefficient from a previous time period weighted by a first leakage factor, and
a product of (i) a signal received during the current time period and (ii) a time-delayed version of a previously transmitted signal, wherein the product is weighted by a second leakage factor, the second leakage factor comprising a quotient of the first leakage factor divided solely by a variance of the signal previously transmitted by the transmitter.

26. The method of claim 25, comprising the step of:
b) finite impulse filtering the near-end interference from the signal received during the current time period in accordance with the plurality of filter coefficients generated in step (a).

27. The method of claim 25, wherein each of the plurality of filter coefficients is generated in step (a) according to the formula:

$$C_j(k+1) = (1-\beta) * C_j(k) + \frac{\beta}{\sigma^2} * x(k+1) * b(k-j)$$

wherein:
$C_j(k)$ is the filter coefficient from the previous time period,
Cj(k+1) is the filter coefficient for the current time period,
x(k+1) is the signal received during the current time period,
b(k-j) is the previously transmitted signal delayed by j delay units,
(1-β) is the first leakage factor,
$\sigma^2$ is the variance of the signal previously transmitted by the transmitter, and
$\beta/\sigma^2$ is the second leakage factor; and
β is a predetermined weighting factor.

28. The method of claim 27, wherein β is equal to an inverse of a number of previously transmitted symbols.

* * * * *